(No Model.)

J. B. LOWMAN.
NECK YOKE COUPLING.

No. 350,688. Patented Oct. 12, 1886.

WITNESSES:
Donn Twitchell
C. Sedgwick

INVENTOR:
J. B. Lowman
BY Munn & Co.
ATTORNEYS.

United States Patent Office.

JACOB B. LOWMAN, OF VIRGINIA CITY, MONTANA TERRITORY.

NECK-YOKE COUPLING.

SPECIFICATION forming part of Letters Patent No. 350,688, dated October 12, 1886.

Application filed June 2, 1886. Serial No. 203,924. (No model.)

*To all whom it may concern:*

Be it known that I, JACOB B. LOWMAN, of Virginia City, in the county of Madison and Territory of Montana, have invented a new and Improved Neck-Yoke Coupling, of which the following is a full, clear, and exact description.

My invention relates to couplings for attachment to a vehicle pole or tongue for holding a neck-yoke thereto, and has for its object to provide a simple, inexpensive, and effective device of this character.

The invention consists in certain novel features of construction and combinations of parts of the neck-yoke coupling, all as hereinafter fully described and claimed.

Reference is to be had to the accompanying drawings, forming a part of this specification, in which similar letters of reference indicate corresponding parts in all the figures.

Figure 1:
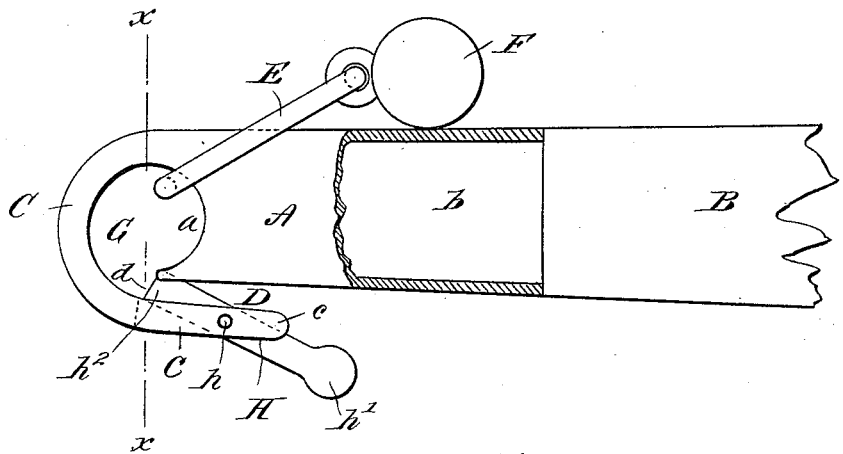
Figure 2:
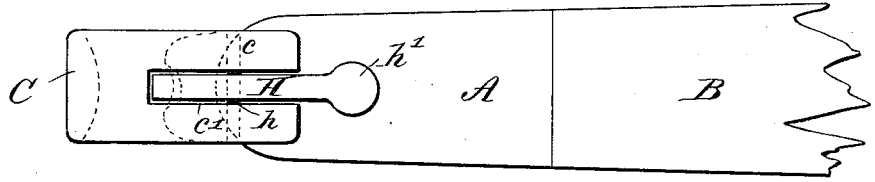
Figure 3:
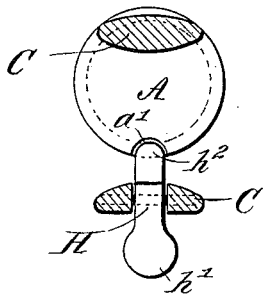

Figure 1 is a side view of the forward end of a vehicle pole or tongue and an end view of a neck-yoke held to the pole by my improved coupling, the socket of the coupling being partly broken away and in section. Fig. 2 is an under side view of the pole and coupling; and Fig. 3 is a cross sectional elevation on the line $x\ x$, Fig. 1.

The metal socket A of the coupling is adapted to fit on the forward end, $b$, of a vehicle pole or tongue, B. From the forward end and top part of the socket A there projects a hook, C, which preferably is cast or forged with the socket, and which curves around downwardly, and so its extremity $c$ extends beneath the end of the socket A, but lies a little distance therefrom, to provide a slot or opening, D, through which the ring E of the neck-yoke F may be passed into the eye G, formed between the curved hook C and a concavity, $a$, in the forward end of the socket A.

In a longitudinally-ranging slot, $c'$, in the end $c$ of the hook C there is pivoted on a pin, $h$, a gravity-latch, H, having a weighted back end, $h'$, which normally swings the forward end, $h^2$, of the latch across the throat $d$ of the slot D, and thereby prevents the escape of the neck-yoke ring E from the coupling; hence the neck-yoke cannot slip backward on the pole B and allow the wagon or other vehicle to press upon the horses and cause them to run away and endanger life and property.

The end $h^2$ of the latch H enters a notch, $a'$, made in the end of the socket A, whereby the latch-pivot and the slotted end $c$ of the hook C will be relieved of racking strains should the latch accidentally strike anything as the pole swings to either side. Furthermore, the entrance of the latch into the notch $a'$ prevents the end $h^2$ of the latch from being thrown down to open the slot D by the neck-yoke ring.

To apply the neck-yoke to the pole B, it only is necessary to slip the ring E into the slot D and push it forward into the eye G, the latch then being operated by the ring to open the throat $d$ of the slot, and to remove the neck-yoke the back end, $h'$, of the latch will be raised by the finger to open the throat of the slot and allow the neck-yoke ring to slip through the slot, as will readily be understood.

With this coupling, neck-yokes having a ring, E, of any size may be connected securely to the pole or tongue of a vehicle, and as the horses hold back, the ring will draw directly against the center of the concaved end $a$ of the socket A, and will have less tendency to bend or break the pole than when neck-yoke couplings of other construction are employed.

Having thus fully described my invention, I claim as new and desire to secure by Letters Patent—

The combination, in a neck-yoke coupling, of a socket or body piece, A, provided with a concaved forward end, as at $a$, a hook, C, connected thereto and extending below the socket, thereby providing a slot, D, and a latch attached to hook C and normally closing the slot D, substantially as described, for the purposes set forth.

JACOB B. LOWMAN.

Witnesses:
FAYETTE HARRINGTON,
JAMES E. CALLAWAY.